(12) United States Patent
Yang et al.

(10) Patent No.: US 11,306,803 B2
(45) Date of Patent: Apr. 19, 2022

(54) VEHICLE DRIVE UNIT ASSEMBLY

(71) Applicant: GKN Automotive Limited, Redditch (GB)

(72) Inventors: Lei Yang, Novi, MI (US); Brent Peura, Farmington, MI (US)

(73) Assignee: GKN Automotive Limited, Birmingham (GB)

( * ) Notice: Subject to any disclaimer, the term of this patent is extended or adjusted under 35 U.S.C. 154(b) by 134 days.

(21) Appl. No.: 16/683,722

(22) Filed: Nov. 14, 2019

(65) Prior Publication Data

US 2021/0148443 A1 May 20, 2021

(51) Int. Cl.
*F16H 37/04* (2006.01)

(52) U.S. Cl.
CPC ..... *F16H 37/04* (2013.01); *F16H 2200/2005* (2013.01); *F16H 2200/2094* (2013.01); *F16H 2702/02* (2013.01)

(58) Field of Classification Search
None
See application file for complete search history.

(56) References Cited

U.S. PATENT DOCUMENTS

| | | | | |
|---|---|---|---|---|
| 4,582,160 A | * | 4/1986 | Weismann | B60K 17/346 180/250 |
| 4,721,011 A | * | 1/1988 | Kubo | B60K 17/346 180/248 |
| 4,969,532 A | * | 11/1990 | Oyama | B60K 17/346 180/233 |
| 5,102,378 A | | 4/1992 | Gobert | |
| 6,117,038 A | * | 9/2000 | Nishiji | B60K 17/16 475/198 |
| 2012/0083380 A1 | | 4/2012 | Reed et al. | |
| 2012/0142474 A1 | | 6/2012 | Troennberg et al. | |
| 2013/0303326 A1 | | 11/2013 | Downs et al. | |
| 2016/0131240 A1 | | 5/2016 | Cooper | |

OTHER PUBLICATIONS

Written Opinion & International Search Report for PCT/US2020/060371 dated Feb. 5, 2021, 9 pages.

\* cited by examiner

*Primary Examiner* — Colby M Hansen
(74) *Attorney, Agent, or Firm* — Jennifer M. Brumbaugh; Reising Ethington P.C.

(57) ABSTRACT

A rear drive unit (RDU) for a vehicle includes a shift collar, a sleeve disposed around the shift collar, a planetary gear set, a differential including a side gear, and a locking plate configured to engage the side gear. The sleeve is configured to move the shift collar between a first position and a second position. The planetary gear set includes a sun gear and at least one planetary gear engaged with the sun gear. The sun gear is configured to engage the shift collar in the second position. The at least one planetary gear includes a pin extending through an entire length of the at least one planetary gear. The shift collar is configured to exert a force upon the locking plate via the pin to move the locking plate into engagement with the side gear in a third position.

20 Claims, 9 Drawing Sheets

US 11,306,803 B2

VEHICLE DRIVE UNIT ASSEMBLY

FIELD

The present disclosure relates generally to drive unit assemblies for vehicles.

BACKGROUND

In general, vehicle drivelines transmit torque from a vehicle's engine to its wheels. Automotive drivelines sometimes include a drive unit, e.g., a rear drive unit (RDU), for selectively distributing torque to the wheels, e.g., the rear wheels. The RDUs are often equipped in four-wheel and all-wheel automotive driveline configurations. A drive unit typically consists of a housing that encloses and supports gears, shafts, and bearings. Shifting may occur between engagement of various components (e.g., gears, shafts, etc.) to selectively modify the torque distributed in the drive unit. Drive units incorporating or connected to a differential may be able to selectively lock and unlock gears in the differential. While solenoid actuators may be used to achieve said locking and unlocking, solenoid actuators require dedicated electric power and control and typically occupy a large amount of space.

This section provides background information related to the present disclosure which is not necessarily prior art.

DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Figure 1:
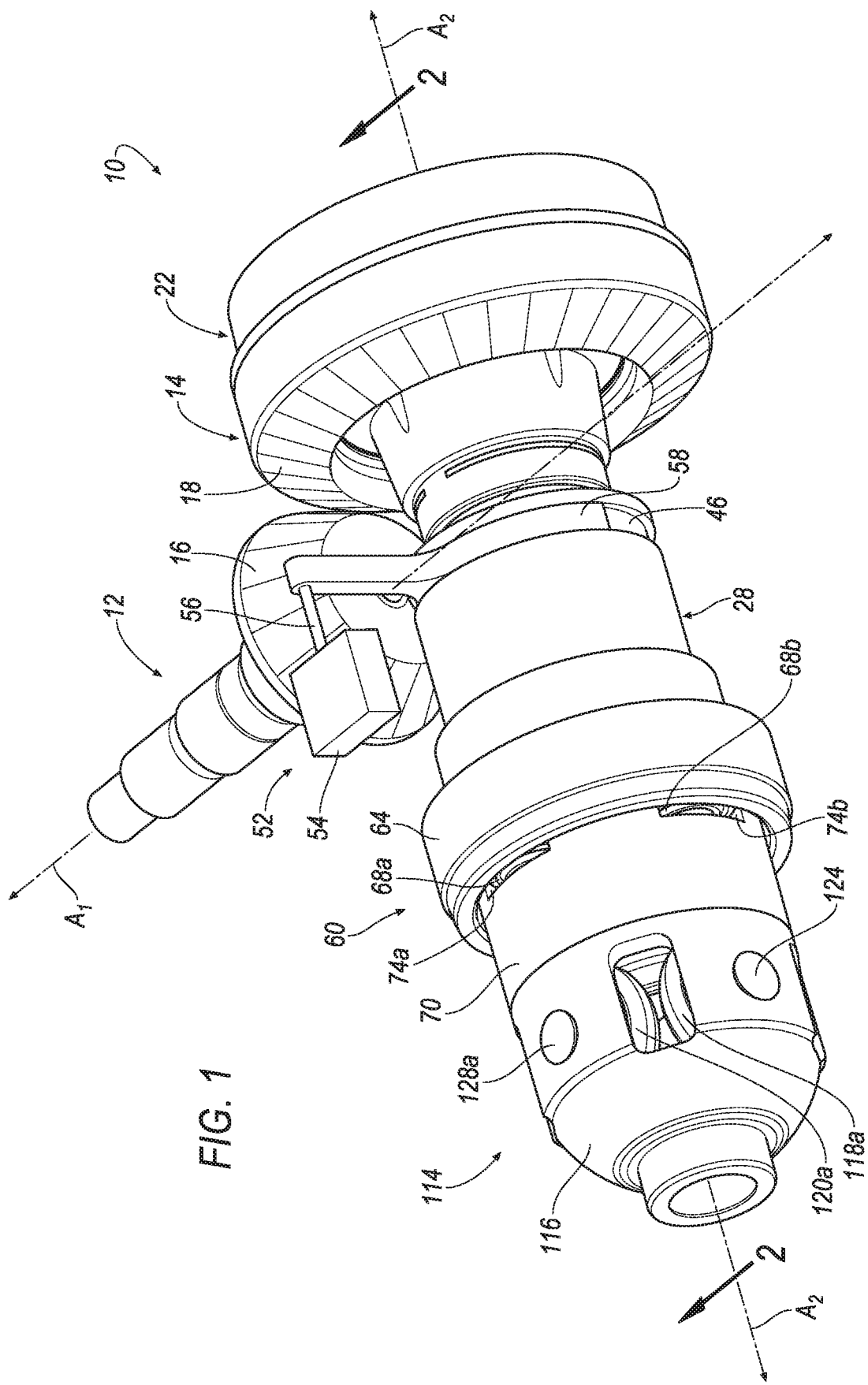
FIG. 1 is a perspective view of a rear drive unit (RDU) assembly in accordance with principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

One aspect of the disclosure provides a rear drive unit (RDU) for a vehicle that includes a shift collar, a sleeve disposed around the shift collar, a planetary gear set, a differential including a side gear, and a locking plate configured to engage the side gear. The sleeve is configured to move the shift collar between a first position and a second position. The planetary gear set includes a sun gear and at least one planetary gear engaged with the sun gear. The sun gear is configured to engage the shift collar in the second position. The at least one planetary gear includes a pin extending through an entire length of the at least one planetary gear. The sleeve is configured to exert a force upon the locking plate via the pin to move the locking plate into engagement with the side gear in a third position.

Implementations of the disclosure may include one or more of the following features. In some implementations, the RDU may include an input shaft engaged with the shift collar. The input shaft may be configured to transfer torque to the shift collar.

In some implementations, the planetary gear set may include a planetary cage configured to house the sun gear and the at least one planetary gear. The differential may include a differential housing configured to house the side gear. In the first position, the shift collar may be configured to transfer torque to the side gear through the at least one planetary gear and the differential housing. In the second position, the shift collar may be configured to transfer torque to the side gear through the sun gear, the at least one planetary gear, and the differential housing. In the third position, the sleeve may be configured to transfer torque to the side gear through the sun gear, the at least one planetary gear, the pin, and the locking plate.

In some implementations, the RDU may include a spring disposed between the shift collar and the sleeve. The spring may be configured to compress as the sleeve moves from the second position to the third position. The at least one planetary gear may be radially engaged with the sun gear and the sun gear may be laterally engaged with the shift collar in the second position. The differential may be directly adjacent the planetary gear set.

Another aspect of the disclosure provides a rear drive unit (RDU) for a vehicle, the RDU including a planetary gear set, a locking differential disposed directly adjacent the planetary gear set, and an input shaft configured to selectively transfer torque to the locking differential through the planetary gear set.

Implementations of the disclosure may include one or more of the following features. In some implementations, the RDU may include a shift collar and a sleeve disposed around the shift collar. The sleeve may be configured to move the shift collar between a first position and a second position. The RDU may include an input shaft engaged with the shift collar. The input shaft may be configured to transfer torque to the shift collar. The RDU may include a spring disposed between the shift collar and the sleeve. The spring may be configured to compress as the sleeve moves from the second position to a third position. The RDU may include a locking plate configured to engage a side gear of the locking differential. The sleeve may be configured to exert a force upon the locking plate to move the locking plate into engagement with the side gear in the third position.

In some implementations, the planetary gear set includes a sun gear and at least one planetary gear engaged with the sun gear. The sun gear may be configured to engage the shift collar in the second position and the at least one planetary gear including a pin extending through an entire length of the at least one planetary gear. The at least one planetary gear may be radially engaged with the sun gear and the sun gear may be laterally engaged with the shift collar in the second position.

In some implementations, the planetary gear set may include a planetary cage configured to house a sun gear and at least one planetary gear. The locking differential may include a differential housing configured to house a side gear. The RDU may include a shift collar and a sleeve disposed around the shift collar. The sleeve may be configured to move the shift collar between a first position and a second position. In the first position, the shift collar may be configured to transfer torque to the side gear through the at least one planetary gear and the differential housing. In the second position, the shift collar may be configured to transfer torque to the side gear through the sun gear, the at least one planetary gear, and the differential housing. The RDU may include a locking plate configured to engage the side gear. The sleeve may be configured to exert a force upon the locking plate through a pin extending through the at least one planetary gear to move the locking plate into engagement with the side gear in a third position. In the third position, the RDU may be configured to transfer torque to the side gear through the sun gear, the at least one planetary gear, the pin, and the locking plate.

Referring to the figures, a rear drive unit (RDU) 10 is generally shown. The RDU 10 is configured to deliver torque to and drive rear wheels of a vehicle, such as an automobile, as will become apparent. While the RDU 10 is described herein as being implemented in a rear portion of a vehicle, it should be understood that the RDU 10 may be implemented in a front of a vehicle. The RDU 10 may include a locking differential disposed directly adjacent a planetary gear set, such that components of the RDU 10 for actuating to selective lock the locking differential may be incorporated into shifting to and away from gears of the planetary gear set. Such a configuration may reduce the amount of components needed in the RDU 10, thus, reducing size and weight. Further, the actuation may be accomplished without a solenoid actuator, which, in addition to reducing size and weight, eliminates the need for dedicated electric power and control to the solenoid actuator.

Figure 2A:
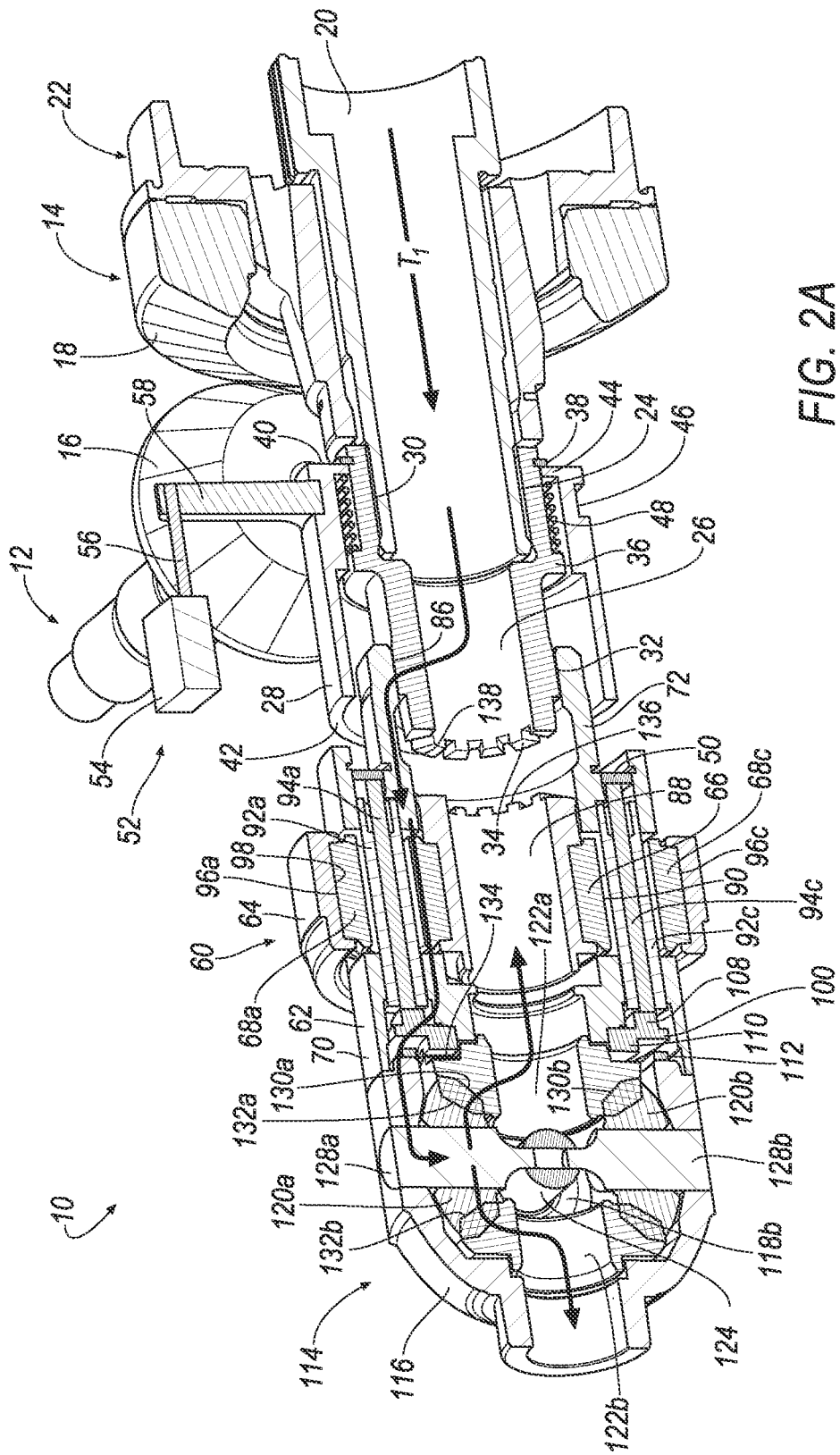
FIG. 2A is a cross-sectional view of the RDU assembly of FIG. 1 taken along line 2-2 in FIG. 1, with the RDU assembly in a first position.
Figure 2B:
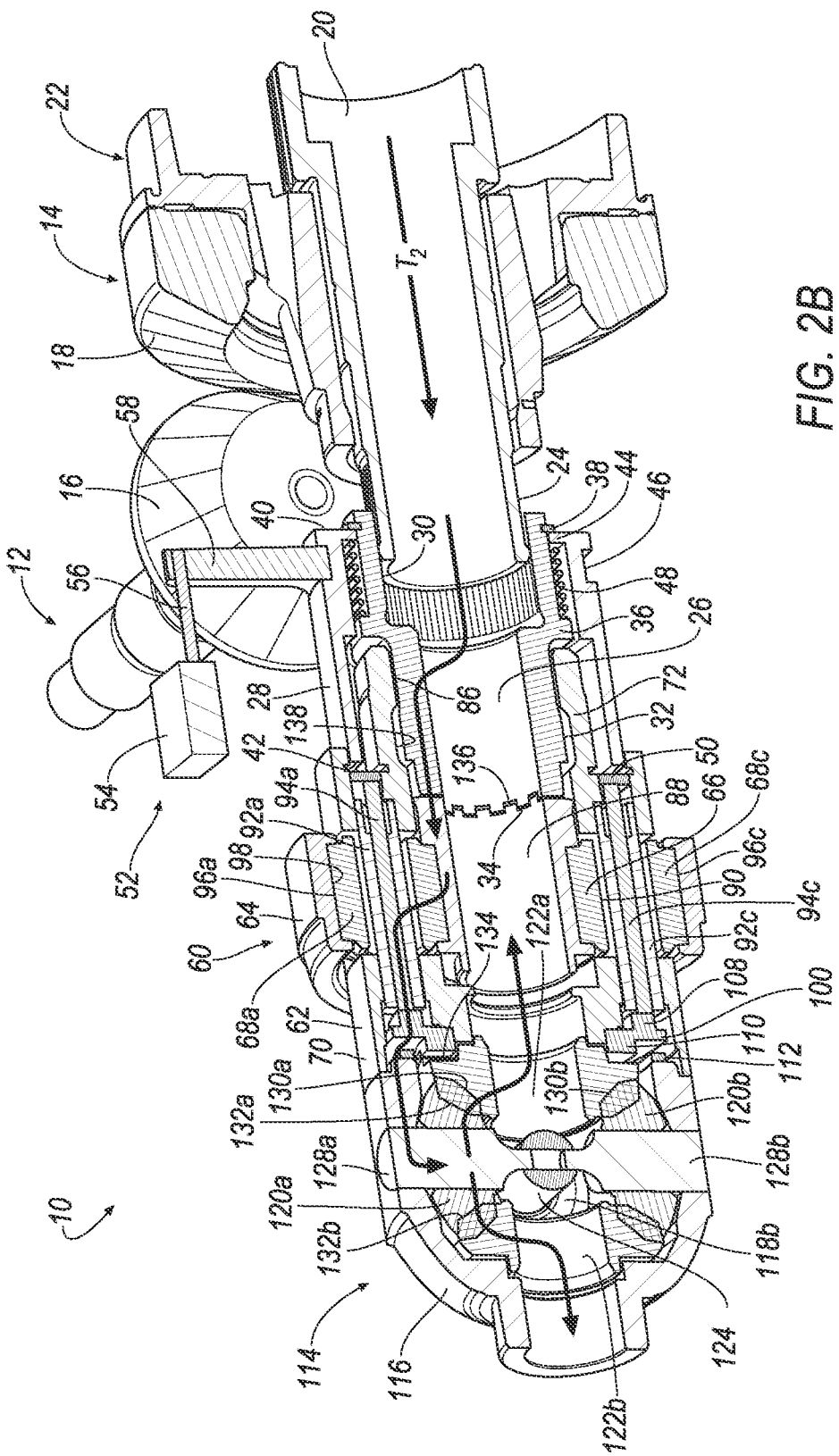
FIG. 2B is a cross-sectional view of the RDU assembly of FIG. 1 taken along line 2-2 in FIG. 1, with the RDU assembly in a second position.
Figure 2C:
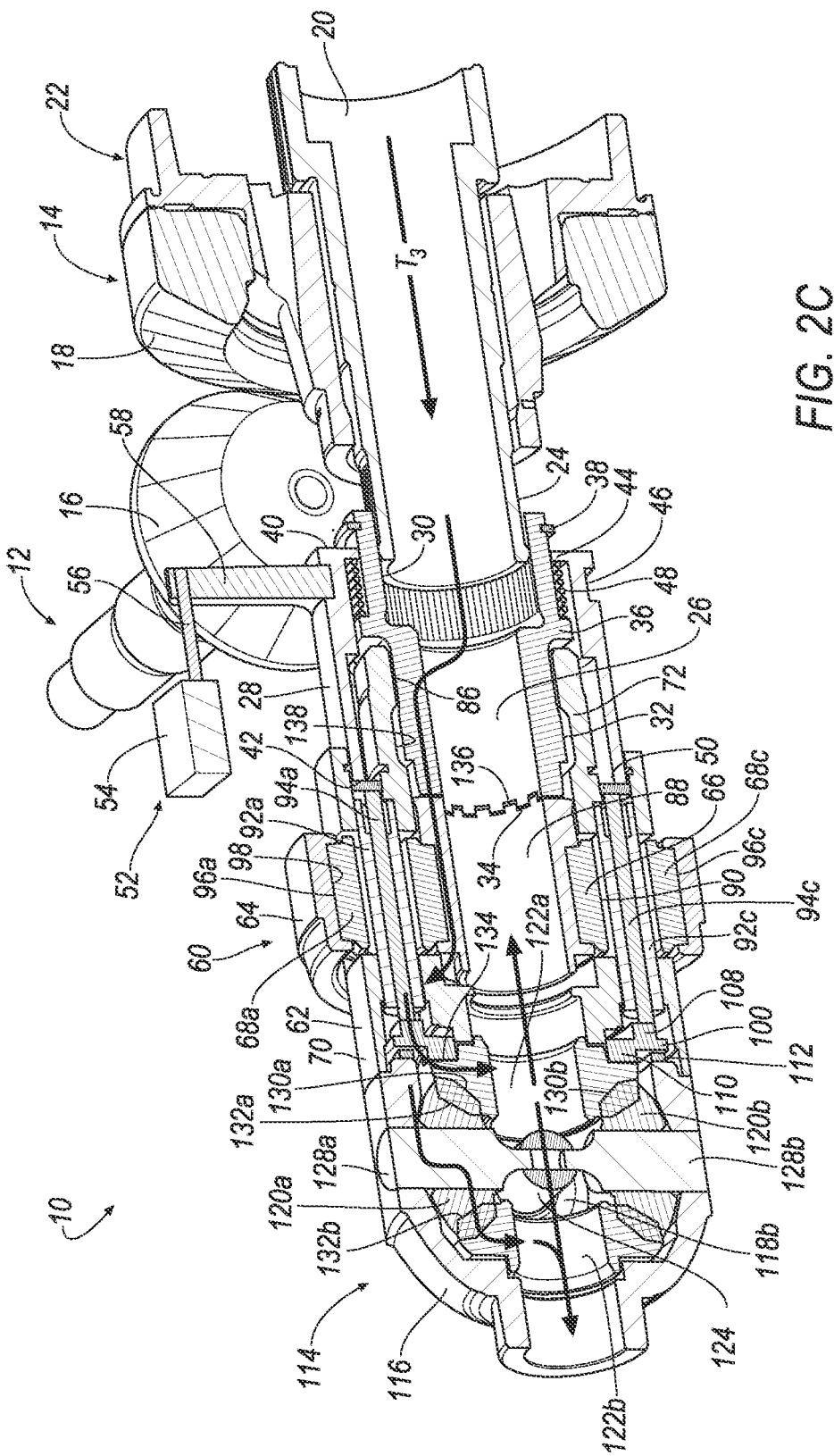
FIG. 2C is a cross-sectional view of the RDU assembly of FIG. 1 taken along line 2-2 in FIG. 1, with the RDU assembly in a third position.
Figure 3:
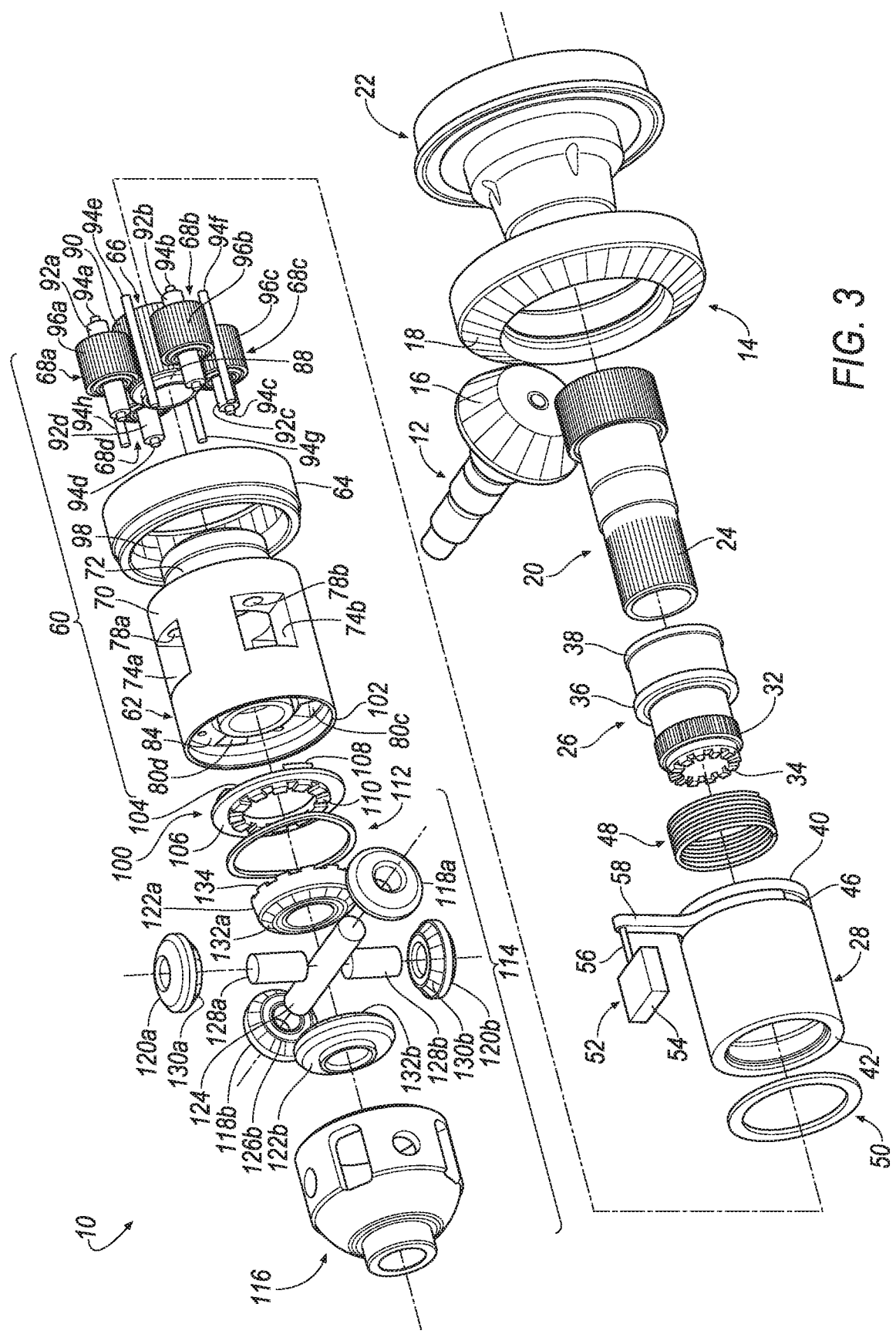
FIG. 3 is an exploded perspective view of the RDU assembly of FIG. 1.

Referring to FIGS. 1-3, the RDU 10 includes a driveshaft 12 rotatable about a first axis $A_1$ and a hypoid gear 14 rotatable about a second axis $A_2$ perpendicular to the first axis $A_1$. The driveshaft 12 is operably connected to an engine (not shown) and/or transmission (not shown) at a front region of the vehicle. The driveshaft 12 includes a plurality of driveshaft teeth 16 and the hypoid gear 14 includes a plurality of hypoid teeth 18 configured to engage the driveshaft teeth 16. As the driveshaft 12 rotates about the first axis $A_1$, the driveshaft teeth 16 engage with the hypoid teeth 18 to deliver torque from the driveshaft 12 to the hypoid gear 14 to rotate the hypoid gear about the second axis $A_2$.

Referring to FIGS. 2A-2C, the RDU 10, i.e., certain components of the RDU 10, is operable in a first position (FIG. 2A), a second position (FIG. 2B), and a third position (FIG. 2C). The RDU 10 in the first position may be generally operating in a high-speed, open-differential (or unlocked-differential) configuration, the RDU 10 in the second position may be generally operating in a low-speed, open-differential (or unlocked-differential) configuration, and the RDU 10 in the third position may be generally operating in a low-speed, locked-differential configuration. The RDU 10 may deliver torque along a first torque path $T_1$ in the first position, a second torque path $T_2$ in the second position, and a third torque path $T_3$ in the third position. While three positions are described herein, it should be understood that the RDU 10 may operate at any suitable number of positions. As one example, the RDU 10 may operate at an additional high-speed, locked differential configuration.

Referring to FIGS. 2A-3, the RDU 10 includes an input shaft 20 rotatable about the second axis $A_2$ and a shaft housing 22 disposed around and secured to the input shaft 20. The shaft housing 22 is rotatable about the second axis $A_2$ and secured to the hypoid gear 14 such that as the hypoid gear 14 rotates, the shaft housing 22 likewise rotates. Similarly, the input shaft 20 is secured to the shaft housing 22 such that as the shaft housing 22 rotates, the input shaft 20 rotates. Thus, the driveshaft 12 may drive rotation of the hypoid gear 14 which, in turn, drives rotation of the input shaft 20 through the shaft housing 22. For example, the driveshaft 12 may be configured to transfer torque to the input shaft 20. The input shaft 20 includes a plurality of input teeth 24 on an outer surface of the input shaft 20.

The RDU 10 includes a shift collar 26 and a sleeve 28 disposed around the shift collar 26. The shift collar 26 and the sleeve 28 are coaxial with the input shaft 20 and the hypoid gear 14. The shift collar 26 is rotatable about the second axis $A_2$. In some implementations, the sleeve 28 is rotatable about the second axis $A_2$. In other implementations, the sleeve is fixed relative to the second axis $A_2$. The shift collar 26 includes a plurality of inner teeth 30 on an inner surface of the shift collar 26, the inner teeth 30 being configured to engage the input teeth 24 of the input shaft 20. The input shaft 20 is configured to transfer torque to the shift collar 26 via engagement of the input teeth 24 and the inner teeth 30. The shift collar 26 includes a plurality of outer teeth 32 on an outer surface of the shift collar 26 and a plurality of distal teeth 34 at an end of the shift collar 26.

The shift collar 26 includes a distal lip 36 and a flange 38 spaced from the distal lip 36. The distal lip 36 and the flange 38 may each extend radially outward from an outer surface of the shift collar 26. The distal lip 36 and the flange 38 may be integrally formed with the shift collar 26 or the distal lip 36 and the flange 38 may be separately formed and secured to the shift collar 26. In some implementations, the flange 38 may include a slot and a ring disposed within the slot, as can be seen in FIGS. 2A-2C. The distal lip 36 may likewise have a similar configuration.

The sleeve 28 extends from a proximal end 40 to a distal end 42. The sleeve 28 includes a proximal lip 44 disposed at or near the proximal end 40, and the sleeve 28 includes a slot 46 formed into an outer surface of the sleeve 28. An end of the proximal lip 44 is configured to be disposed at or near an outer surface of the shift collar 26 between the distal lip 36 and the flange 38. Disposed between the proximal lip 44 and the distal lip 36 is a first spring 48 wrapped around the shift collar 26. The first spring 48 may extend from the distal lip 36 to the proximal lip 44, i.e., the first spring 48 may directly contact the distal lip 36 and the proximal lip 44. In other implementations, the first spring 48 may be implemented in any suitable manner and location. In some implementations, the first spring 48 may bias the shift collar 26 and the sleeve 28 into their locations in the first position. In other implementations, the first spring 48 may not bias the shift collar 26 and the sleeve 28 in the first and second positions, but may bias the shift collar 26 and the sleeve 28 toward the second position when the sleeve is in the third position. That is, the shift collar 26 and the sleeve 28 may be substantially free to move between the first position and the second position, but the first spring 48 may resist movement of the sleeve from the second position to the third position. The first spring 48 may be any suitable type of spring, such as a compression spring, a disc spring, a Belleville washer, a compressible material, etc. The RDU 10 may include a first plate 50 directly adjacent the distal end 42 of the sleeve 28. The first plate 50 may be disposed around at least the shift collar 26.

With continued reference to FIGS. 2A-3, the RDU 10 may include or be connected to a shifting subassembly 52. The shifting assembly 52 may be mounted to the vehicle or disposed at any suitable location. The shifting subassembly 52 may include a motor 54, a rod 56 connected to the motor 54, and a shifting fork 58 connected to the rod 56. The shifting subassembly 52 may operate to shift the RDU 10 between the first position, the second position, and the third position, collectively referred to as the three positions. In some implementations, the shifting fork 58 may engage with the slot 46 of the sleeve 28 and the motor 54 may push and/or pull the shifting fork 58 via the rod 56 to shift the sleeve 28 between the three positions. The motor 54 may be an electric motor or any other suitable motor, such as a linear solenoid actuator, an electromagnetic motor, etc. The shifting fork 58 may be any suitable device, such as a cam, a mechanical linkage, etc. In some implementations, the shifting subassembly 52 may be any suitable shifting mechanism capable of shifting the sleeve 28 between the three positions.

Referring to FIGS. 2A-5, the RDU 10 includes a planetary subassembly 60. In some implementations, the planetary subassembly 60 is disposed directly adjacent the shift collar 26 and the sleeve 28. In other implementations, the planetary subassembly 60 is disposed at any suitable location, such as spaced from the shift collar 26 and the sleeve 28 and/or disposed on the opposite side of the shift collar 26 and the sleeve 28 than as shown in the figures. The planetary subassembly 60 includes a planetary cage 62, a ring gear 64, a sun gear 66, and a plurality of planetary gears 68, e.g., four planetary gears 68a-d.

Figure 4A:
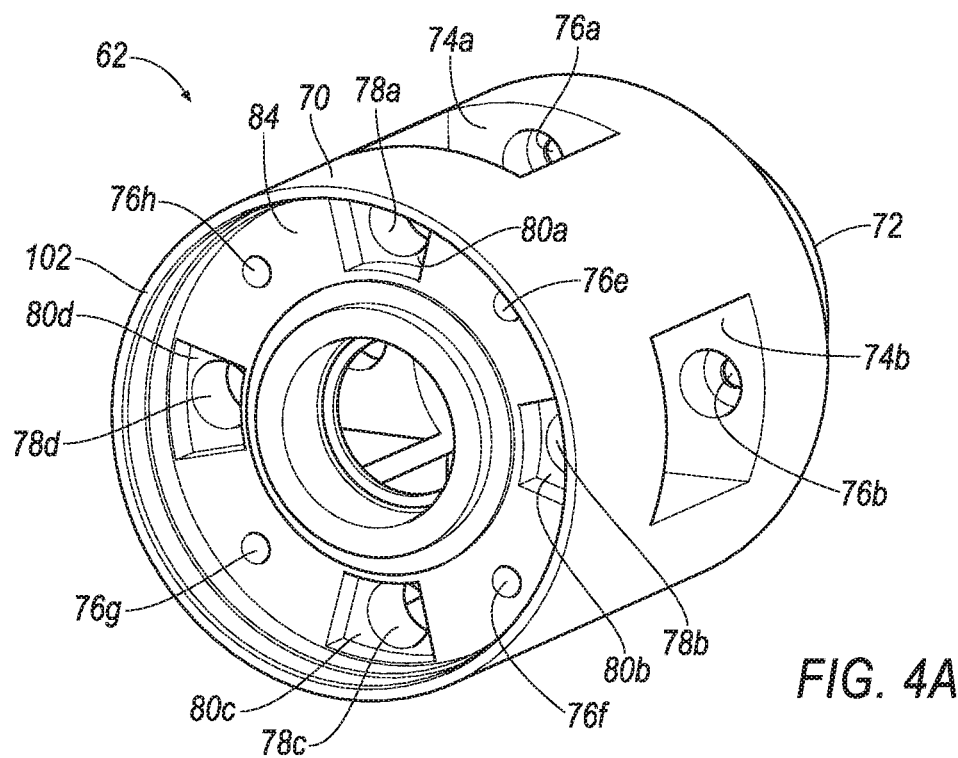
FIG. 4A is a perspective view of a first side of a planetary cage of the RDU assembly of FIG. 1.
Figure 4B:
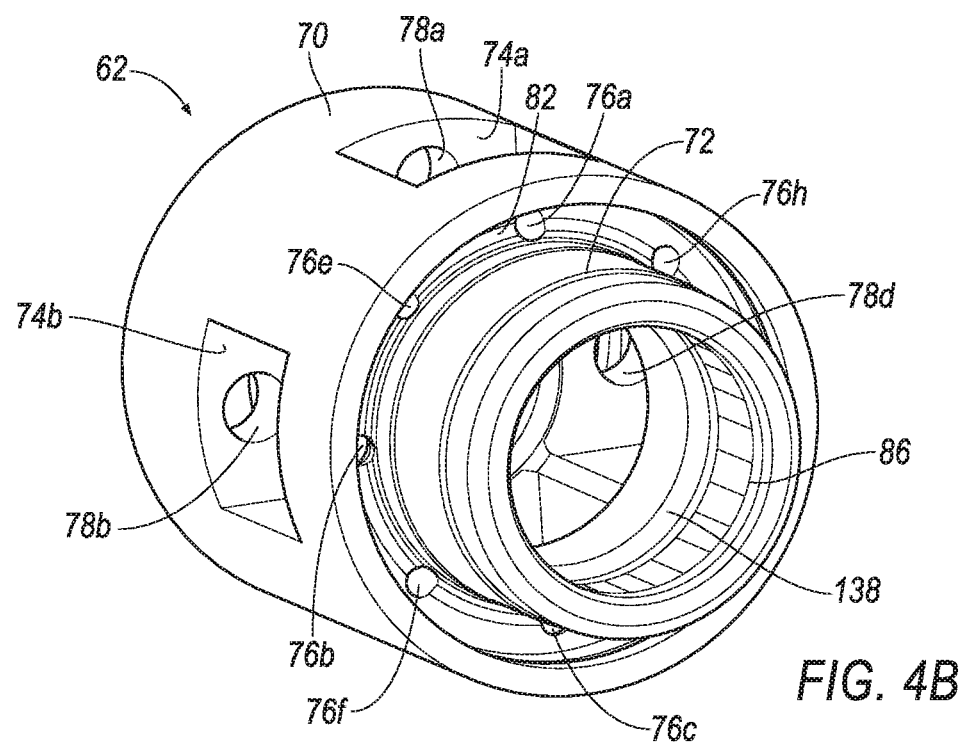
FIG. 4B is a perspective view of a second side of the planetary cage of FIG. 4A.
Figure 5:
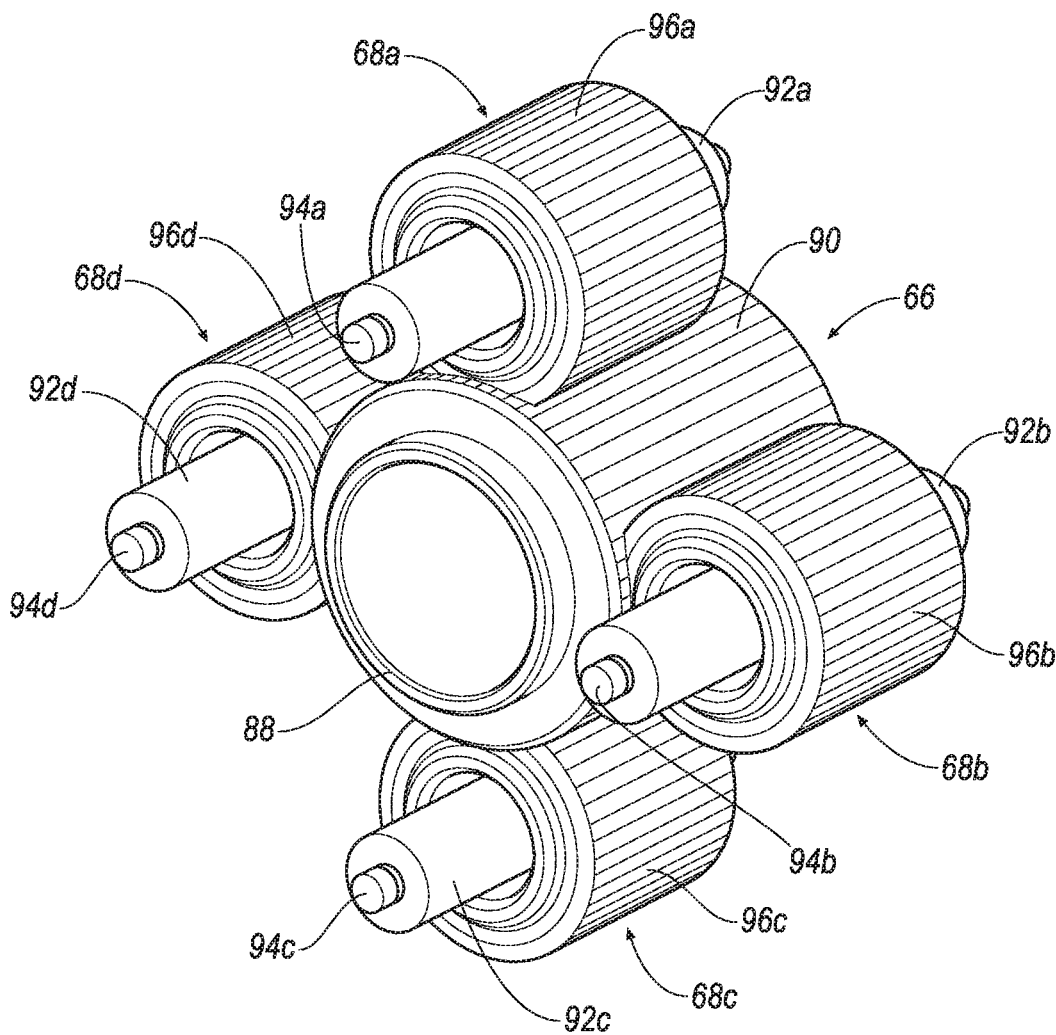
FIG. 5 is a perspective view of a planetary subassembly of the RDU assembly of FIG. 1.
Figure 6A:
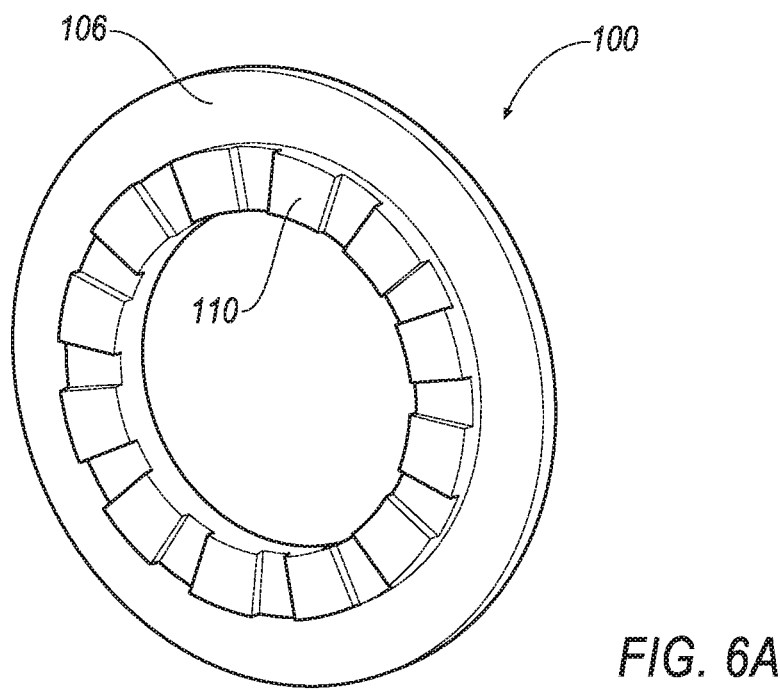
FIG. 6A is a perspective view of a first side of a locking plate of the RDU assembly of FIG. 1.
Figure 6B:
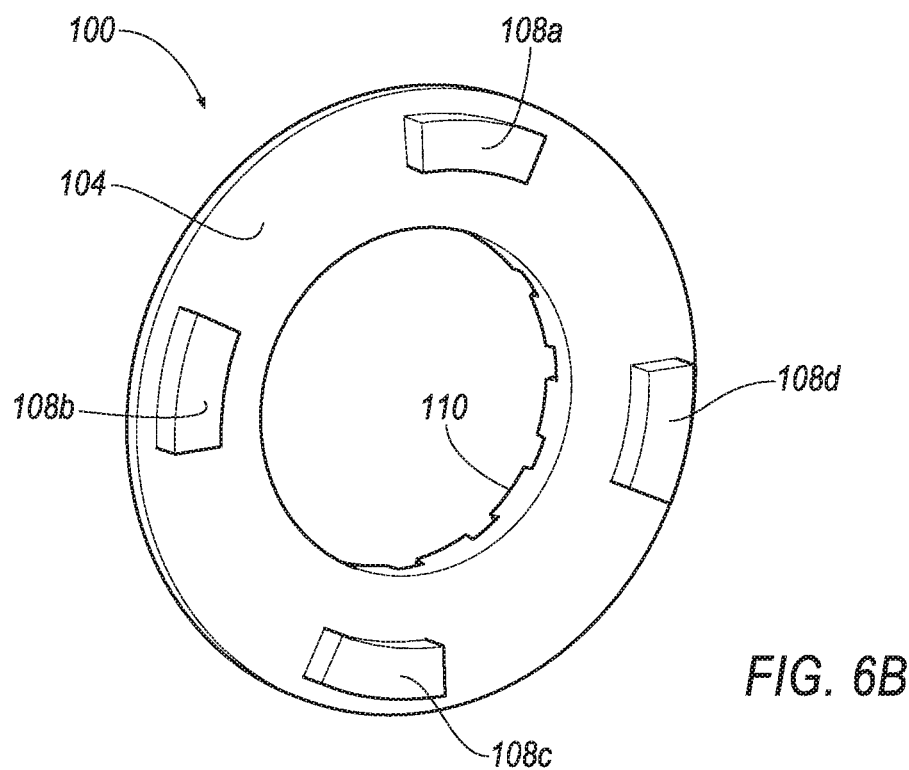
FIG. 6B is a perspective view of a second side of the locking plate of FIG. 6A.
Figure 7:
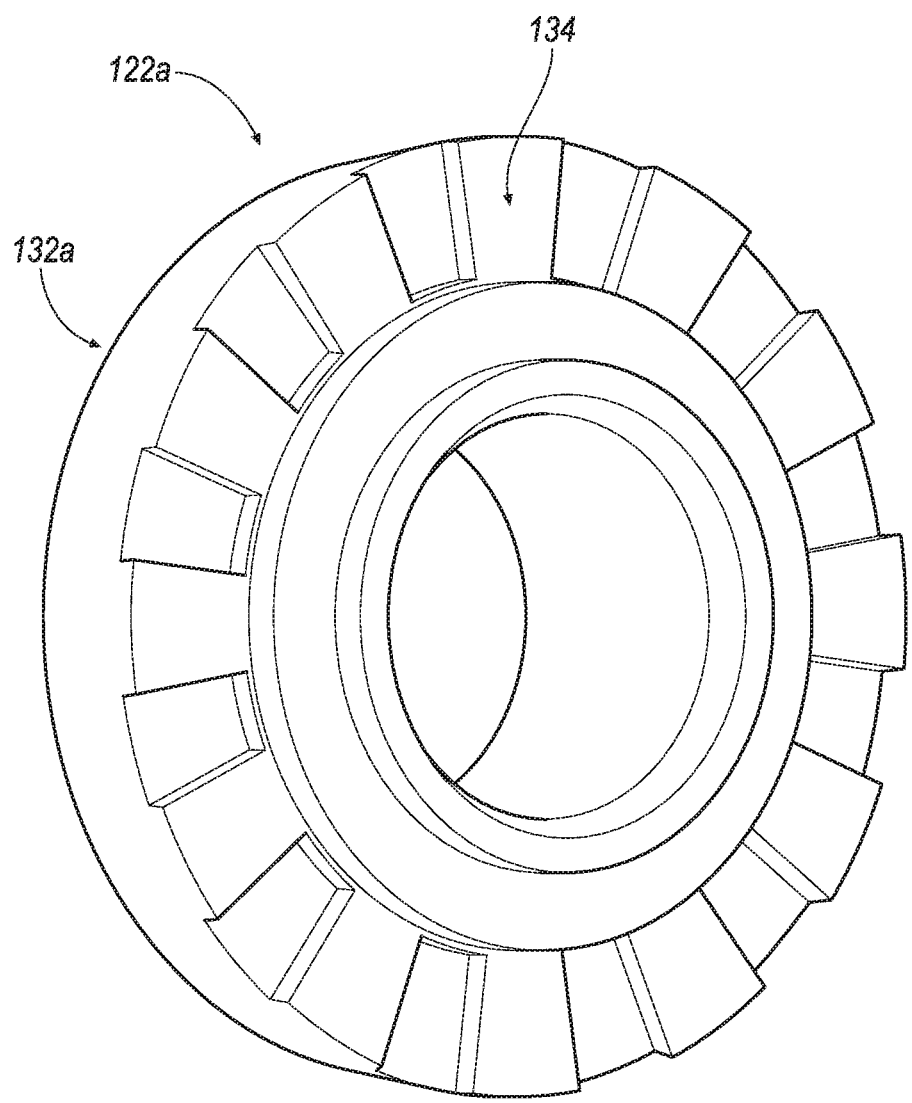
FIG. 7 is a perspective view of a side gear of a differential of the RDU assembly of FIG. 1.

The planetary cage 62 includes a main body 70 and a collar portion 72 extending from the main body 70 along the second axis $A_2$. The main body 70 includes a plurality of windows 74a-d, a plurality of pin apertures 76a-h, a plurality of shaft apertures 78a-d, and a plurality of recesses 80a-d. In some implementations, the planetary cage 62 is configured to rotate about the second axis $A_2$, whereas the ring gear 64 is fixed relative to the second axis $A_2$. The windows 74a-d may extend through an entire thickness of the main body 70 to receive the planetary gears 68a-d, respectively. The pin apertures 76a-h may extend through an entire length of the main body 70 along the second axis $A_2$. The main body 70 extends from a proximal end 82 to a distal end 84, and the shaft apertures 78a-d may extend through the main body 70 at the distal end 84, but may terminate before the proximal end 82, as can be seen in FIGS. 4A and 4B. The shaft apertures 78a-d may be concentric and coaxial with the pin apertures 76a-d, respectively. The recesses 80a-d may likewise be disposed on a common axis with the respective pin apertures 76a-d and shaft apertures 78a-d. In some implementations, the recesses 80a-d may be disposed on a common axis with the pin apertures 76e-h. In other implementations, there may be eight total recesses 80, each of which is disposed on a common axis with each of the pin apertures 76a-h, respectively. The recesses 80a-d may be formed at or near the distal end 84 of the main body 70.

The collar portion 72 may extend from the proximal end 82 of the main body 70 along the second axis $A_2$. The collar portion 72 may be integrally formed with the main body 70 or the collar portion 72 may be formed separately and secured to the main body 70 in any suitable manner. In an assembled configuration, as shown in FIGS. 1-2C, the collar portion 72 may extend over and surround the shift collar 26, and the first plate 50 may be disposed between the collar portion 72 and the sleeve 28. The collar portion 72 includes a plurality of inner teeth 86 that are configured to engage with the outer teeth 32 of the shift collar 26. The shift collar 26 is configured to transfer torque to the planetary cage 62 via engagement of the outer teeth 32 and the inner teeth 86. The collar portion 72 may include a groove 138 adjacent the inner teeth 86. The groove 138 may be configured to receive the outer teeth 32 of the shift collar 26. For example, the groove 138 may receive the outer teeth 32 in the second and third positions. The groove 138 has a larger diameter than the inner teeth 86, such that, when the groove 138 receives the outer teeth 32 of the shift collar 26, the outer teeth 32 do not contact the collar portion 72 at the groove 138. Such a configuration results in the shift collar 26 not transferring torque to the planetary cage 62 at the outer teeth 32 and the groove 138, and, instead, the shift collar 26 transfers torque to the sun gear 66 in the second and third positions, as will become apparent.

Referring to FIGS. 2A-3 and 5, the sun gear 66 includes a sun shaft 88 and a plurality of sun teeth 90. The sun gear 66 is coaxial with the shift collar 26 and is rotatable about the second axis $A_2$. A majority of the sun shaft 88 is disposed within the main body 70 of the planetary cage 62, and, in some implementations, a portion of the sun shaft 88 extends into the collar portion 72 of the planetary cage 62. The sun shaft 88 includes a plurality of proximal teeth 136 at an end adjacent the shift collar 26. The proximal teeth 136 are configured to engage with the distal teeth 34 of the shift collar 26. For example, the sun gear 66 may be laterally engaged with the shift collar 26. In some implementations, the proximal teeth 136 are disengaged with the distal teeth 34 in the first position and the proximal teeth 136 are engaged with the distal teeth 34 in the second and third positions. The shift collar 26 is configured to transfer torque to the sun gear 66 via engagement of the distal teeth 34 and the proximal teeth 136.

The planetary gears 68a-d include planetary shafts 92a-d, planetary pins 94a-d, and planetary teeth 96a-d. As shown, the planetary subassembly 60 may include four planetary gears 68a-d. In other implementations, there may be any suitable number of planetary gears 68. The planetary shafts 92a-d are disposed within the shaft apertures 78 of the planetary cage 62, and the planetary pins 94a-d are disposed within the pin apertures 76 and extend through an entire length of the planetary shafts 92a-d. In some implementations, the planetary subassembly 60 includes four additional planetary pins 94e-h that are separate and spaced from the planetary shafts 92 and disposed in the pin apertures 76e-h. In other implementations, the planetary shafts 92a-d may not include any planetary pins 94, and, instead, only the planetary pins 94e-h disposed in the pin apertures 76e-h may be present. The planetary teeth 96 are configured to engage with the sun teeth 90 and a plurality of teeth 98 on an inner surface of the ring gear 64. For example, the planetary gears 68a-d may be radially engaged with the sun gear 66. In some implementations, the planetary teeth 96 may extend through the windows 74 of the planetary cage 62 and engage the teeth 98 of the ring gear 64.

Referring to FIGS. 2-3, 6A, and 6B, the RDU 10 includes a locking plate 100 disposed directly adjacent the distal end 84 of the main body 70 of the planetary cage 62. In some implementations, the main body 70 includes a groove 102 extending from the distal end 84 that is configured to receive and house the locking plate 100. The locking plate 100 includes a proximal side 104 and a distal side 106. In the first and second positions, the proximal side 104 directly abuts the distal end 84 of the planetary cage 62 and the distal side 106 faces away from the planetary cage 62. The locking plate 100 includes a plurality of protrusions 108a-d extending from the proximal side 104 and a plurality of first locking teeth 110 extending from the distal side 106. The protrusions 108a-d are configured to engage the recesses 80a-d in the distal end 84 of the planetary cage 62. As can be seen in FIG. 2C, the protrusions 108a-d are configured to receive the planetary pins 94a-d. In implementations where the planetary pins 94e-h are present, the pins 94e-h may contact the proximal side 104 of the locking plate 100 or there may be four additional recesses 80 and protrusions 108 to receive the planetary pins 94e-h. The engagement of the protrusions 108a-d and the recesses 80a-d causes the locking plate 100 to rotate along with the planetary cage 62. For example, the locking plate 100 may be coaxial with the planetary cage 62 and rotatable about the second axis $A_2$.

In the first and second positions, the protrusions 108a-d are disposed in and engaged with the recesses 80a-d such that the proximal side 104 of the locking plate directly abuts the distal end 84 of the main body 70 of the planetary cage 62. In the third position, in some implementations, the protrusions 108a-d are spaced from and disengaged with the recesses 80a-d such that the proximal side 104 of the locking plate is spaced from the distal end 84 of the main body 70 of the planetary cage 62. In the third position, in other implementations, the protrusions 108a-d are partially disposed in and partially engaged with the recesses 80a-d and the proximal side 104 of the locking plate is spaced from the distal end 84 of the main body 70 of the planetary cage 62.

Referring to FIGS. 2A-C, the RDU 10 includes a second spring 112 disposed directly adjacent the distal side 106 of the locking plate 100. The second spring 112 may be any suitable type of spring, such as a compression spring, a disc spring, a Belleville washer, a compressible material, etc. The second spring 112 may bias the locking plate 100 along the second axis $A_2$ toward the protrusions 108a-d engaging with the recesses 80a-d and the proximal side 104 directly abutting the distal end 84 of the planetary cage 62. That is, the second spring 112 may bias the locking plate 100 toward its location in the first and second positions.

Referring to FIGS. 2A-3 and 7, the RDU 10 includes a differential subassembly 114 (also referred to as a locking differential) directly adjacent the planetary subassembly 60. The differential subassembly 114 includes a differential housing 116, a pair of spider gears 118a, 118b, a pair of pinion gears 120a, 120b, and a pair of side gears 122 including a proximal side gear 122a and a distal side gear 122b. The differential housing 116 is configured to house the gears 118, 120, 122 and rotate about the second axis $A_2$. In some implementations, the spider gears 118a, 118b rotate about a common spider shaft 124. In other implementations, each of the spider gears 118a, 118b rotates about its own discrete spider shaft 124. Each of the spider gears 118a, 118b includes a plurality of spider teeth 126a, 126b. In some implementations, the pinion gears 120a, 120b rotate about a common pinion shaft 128. In other implementations, each of the pinion gears 120a, 120b rotates about its own discrete pinion shaft 128a, 128b. Each of the pinion gears 120a, 120b includes a plurality of pinion teeth 130a, 130b. In some implementations, the spider gears 118a, 118b may be substantially similar to the pinion gears 120a, 120b. In other implementations, the spider gears 118a, 118b may have any suitable configuration relative to the pinion gears 120a, 120b. The spider gears 118a, 118b and the pinion gears 120a, 120b rotate along with the differential housing 116 about the second axis $A_2$.

The side gears 122a, 122b may each include a shaft (not shown) connected to a wheel of a vehicle. For example, the proximal side gear 122a may be connected to a right rear wheel and the distal side gear 122b may be connected to a left rear wheel. The side gears 122a, 122b may be coaxial with the locking plate 100. The side gears 122a, 122b may rotate about the second axis $A_2$ and control rotation of the corresponding wheels. For example, the proximal side gear 122a may control rotation of the right rear wheel and the distal side gear 122b may control rotation of the left rear wheel. The side gears 122a, 122b each include a plurality of side gear teeth 132a, 132b configured to engage with the spider teeth 126a, 126b and the pinion teeth 130a, 130b.

The proximal side gear 122a includes a plurality of second locking teeth 134 configured to engage the first locking teeth 110 of the locking plate 100. For example, the first locking teeth 110 of the locking plate 100 may engage with second locking teeth 134 of the proximal side gear 122a in the third position. In some implementations, the distal side gear 122b may include the second locking teeth 134 and the locking plate 100 may be disposed adjacent the distal side gear 122b rather than the proximal side gear 122a as shown. In other implementations, both the proximal side gear 122a and the distal side gear 122b may include the second locking teeth 134 and the RDU 10 may include two locking plates 100 to engage each of the proximal side gear 122a and the distal side gear 122b. In the first and second positions, the differential subassembly 114 may operate as an open differential where the proximal side gear 122a and the distal side gear 122b may rotate about the second axis $A_2$ at different speeds, e.g., when a vehicle is making a turn and the outside wheel must rotate faster than the inside wheel. In the third position, the differential subassembly 114 may operate as a locked differential where the proximal side gear 122a and the distal side gear 122b rotate about the second axis $A_2$ at the same speed, e.g., when driving on difficult terrain, such as dirt, gravel, mud or snow.

The components of the RDU 10 as depicted in the figures and described herein may be arranged in any suitable position and orientation. For example, while the differential subassembly 114 is illustrated as being disposed adjacent the planetary subassembly 60 at an end of the RDU 10, the differential subassembly 114 and the planetary subassembly 60 may be disposed at any suitable location of the RDU 10, such as, for example, on an opposite side of the hypoid gear 14 than as shown. In other implementations, the differential subassembly 114 and the planetary subassembly 60 may be spaced from each other.

As depicted in the figures, the teeth (i.e., the driveshaft teeth 16, the hypoid teeth 18, the input teeth 24, the inner teeth 30 of the shift collar 26, the outer teeth 32 of the shift collar 26, the inner teeth 86 of the collar portion 72 of the planetary cage 62, the teeth 98 of the ring gear 64, the sun teeth 90, the planetary teeth 96a-d, the spider teeth 126a, 126b, the pinion teeth 130a, 130b, and the side gear teeth 132a, 132b) are depicted as simple surfaces with lines, however, it should be understood that such illustrations are representative of any suitable tooth configuration. Further, it should be understood that while the illustrative representation of the teeth in the figures may not accurately depict the engagement of the teeth, such engagement still occurs as described herein.

Referring to FIGS. 2A and 2B, to move the RDU 10 from the first position (which may correspond to a high-speed, open-differential configuration) to the second position (which may correspond to a low-speed, open-differential configuration), the motor 54 of the shifting subassembly 52 may pull the shifting fork 58 via the rod 56 along the second axis $A_2$. The shifting fork 58, via engagement with the slot 46 of the sleeve 28, shifts the sleeve 28 along the second axis $A_2$ toward the differential subassembly 114 from a first position of the sleeve to a second position of the sleeve. The sleeve 28 exerts a force upon the first spring 48 at the proximal lip 44 which in turn exerts a force upon the shift collar 26 at the distal lip 36 and shifts the shift collar 26 until the distal teeth 34 of the shift collar 26 engage with the proximal teeth 136 of the sun shaft 88 of the sun gear 66 and the outer teeth 32 are disposed within the groove 138 of the collar portion 72. At this point, the RDU 10 is in the second position.

Referring to FIGS. 2B and 2C, to move the RDU 10 from the second position (which may correspond to a low-speed, open-differential configuration) to the third position (which may correspond to a low-speed, locked-differential configuration), the motor 54 of the shifting subassembly 52 may pull the shifting fork 58 via the rod 56 along the second axis $A_2$. The shifting fork 58, via engagement with the slot 46 of the sleeve 28, shifts the sleeve 28 along the second axis $A_2$ toward the differential subassembly 114 from the second position of the sleeve to a third position of the sleeve. The sleeve 28 exerts a force upon the first spring 48 at the proximal lip 44 which results in the first spring 48 compressing. As the first spring 48 compresses, the distal end 42 of the sleeve 28 exerts a force upon the first plate 50 which exerts a force upon the planetary pins 94a-d, thus, sliding the pins 94a-d along the planetary shafts 92a-d. In some implementations, the distal end 42 of the sleeve 28 exerts a force upon the first plate 50 which exerts a force upon the planetary pins 94a-d and additional planetary pins 94e-h or any combination of the two. The pins 94a-d slide along the planetary shafts 92a-d and exert a force upon the locking plate 100, i.e., the protrusions 108a-d of the locking plate 100. The locking plate 100 moves toward the differential subassembly 114 until it overcomes the bias provided by the second spring 112 and the first locking teeth 110 of the locking plate 100 engage with the second locking teeth 134 of the proximal side gear 122a. At this point, the RDU 10 is in the third position.

Referring to FIG. 2A, in the first position, the first torque path $T_1$ is directed through the driveshaft 12, the hypoid gear 14, the shaft housing 22, the input shaft 20, the shift collar 26 via engagement of the input teeth 24 and the inner teeth 30, the planetary cage 62 via engagement of the outer teeth 32 and the inner teeth 86, the differential housing 116, the spider shaft 124 and the pinion shaft 128, the spider gears 118a, 118b and the pinion gears 120a, 120b, the side gears 122a, 122b, and the wheels of the vehicle.

Referring to FIG. 2B, in the second position, the second torque path $T_2$ is directed through the driveshaft 12, the hypoid gear 14, the shaft housing 22, the input shaft 20, the shift collar 26 via engagement of the input teeth 24 and the inner teeth 30, the sun gear 66 via engagement of the distal teeth 34 and the proximal teeth 136, the planetary gears 68a-d via engagement of the sun teeth 90 and the planetary teeth 96a-d, the planetary cage 62 via engagement of the planetary shafts 92a-d and the shaft apertures 78a-d, the differential housing 116, the spider shaft 124 and the pinion shaft 128, the spider gears 118a, 118b and the pinion gears 120a, 120b, the side gears 122a, 122b, and the wheels of the vehicle.

Referring to FIG. 2C, in the third position, the third torque path $T_3$ is directed through the driveshaft 12, the hypoid gear 14, the shaft housing 22, the input shaft 20, the shift collar 26 via engagement of the input teeth 24 and the inner teeth 30, the sun gear 66 via engagement of the distal teeth 34 and the proximal teeth 136, the planetary gears 68a-d via engagement of the sun teeth 90 and the planetary teeth 96a-d, (i) the planetary cage 62 via engagement of the planetary shafts 92a-d and the shaft apertures 78a-d, the differential housing 116, the spider shaft 124 and the pinion shaft 128, the spider gears 118a, 118b and the pinion gears 120a, 120b, the distal side gear 122b, and the left rear wheel of the vehicle, and (ii) the planetary pins 94*a-d*, the locking plate 100, the proximal side gear 122*a*, and the right rear wheel of the vehicle.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A rear drive unit (RDU) for a vehicle, the RDU comprising:
    a shift collar;
    a sleeve disposed around the shift collar and configured to move the shift collar between a first position of the shift collar and a second position of the shift collar, the sleeve being in a first position when the shift collar is in the first position of the shift collar, the sleeve being in a second position when the shift collar is in the second position of the shift collar, and the sleeve having a third position;
    a planetary gear set including a sun gear and at least one planetary gear engaged with the sun gear, the sun gear being configured to engage the shift collar in the second position, and the at least one planetary gear including a pin extending an entire length of the at least one planetary gear;
    a differential including a side gear; and
    a locking plate configured to engage the side gear, the sleeve being configured to exert a force upon the locking plate via the pin to move the locking plate into engagement with the side gear in the third position.

2. The RDU of claim 1, further comprising an input shaft engaged with the shift collar, the input shaft configured to transfer torque to the shift collar.

3. The RDU of claim 1, wherein the planetary gear set includes a planetary cage configured to house the sun gear and the at least one planetary gear, and wherein the differential includes a differential housing configured to house the side gear.

4. The RDU of claim 3, wherein, in the first position, the shift collar is configured to transfer torque to the side gear through the differential housing.

5. The RDU of claim 3, wherein, in the second position, the shift collar is configured to transfer torque to the side gear through the sun gear, the at least one planetary gear, and the differential housing.

6. The RDU of claim 3, wherein, in the third position, the sleeve is configured to transfer torque to the side gear through the sun gear, the at least one planetary gear, the pin, and the locking plate.

7. The RDU of claim 1, further comprising a spring disposed between the shift collar and the sleeve, the spring configured to compress as the sleeve moves from the second position to the third position.

8. The RDU of claim 1, wherein the at least one planetary gear is radially engaged with the sun gear and the sun gear is laterally engaged with the shift collar in the second position.

9. The RDU of claim 1, wherein the differential is directly adjacent the planetary gear set.

10. The RDU of claim 1, wherein the sleeve moves relative to the shift collar when the sleeve moves from the second position of the sleeve to the third position of the sleeve.

11. The RDU of claim 1 wherein the pin extends: 1) through the at least one planetary gear; or 2) the planetary gear set includes multiple planetary gears and the pin extends between two planetary gears of the multiple planetary gears.

12. A rear drive unit (RDU) for a vehicle, the RDU comprising:
    a planetary gear set;
    a locking differential disposed directly adjacent the planetary gear set;
    an input shaft configured to selectively transfer torque to the locking differential through the planetary gear set;
    a shift collar and a sleeve disposed around the shift collar, the sleeve being configured to move the shift collar between a first position and a second position; and
    a spring disposed between the shift collar and the sleeve, the spring configured to compress as the sleeve moves from the second position to a third position.

13. The RDU of claim 12, further comprising an input shaft engaged with the shift collar, the input shaft configured to transfer torque to the shift collar.

14. The RDU of claim 12, further comprising a locking plate configured to engage a side gear of the locking differential, the sleeve being configured to exert a force upon the locking plate to move the locking plate into engagement with the side gear in the third position.

15. The RDU of claim 12, wherein the planetary gear set includes a sun gear and at least one planetary gear engaged with the sun gear, the sun gear being configured to engage the shift collar in the second position and the at least one planetary gear including a pin extending an entire length of the at least one planetary gear.

16. The RDU of claim 15, wherein the at least one planetary gear is radially engaged with the sun gear and the sun gear is laterally engaged with the shift collar in the second position.

17. The RDU of claim 12, wherein the planetary gear set includes a planetary cage configured to house a sun gear and at least one planetary gear, and wherein the locking differential includes a differential housing configured to house a side gear.

18. A rear drive unit (RDU) for a vehicle, the RDU comprising:
    a planetary gear set;
    a locking differential disposed directly adjacent the planetary gear set;
    an input shaft configured to selectively transfer torque to the locking differential through the planetary gear set;
    a shift collar and a sleeve disposed around the shift collar, the sleeve being configured to move the shift collar between a first position and a second position, wherein the planetary gear set includes a planetary cage configured to house a sun gear and at least one planetary gear, and wherein the locking differential includes a differential housing configured to house a side gear, and wherein, in the first position, the shift collar is configured to transfer torque to the side gear through the differential housing.

19. The RDU of claim 18, wherein, in the second position, the shift collar is configured to transfer torque to the side gear through the sun gear, the at least one planetary gear, and the differential housing.

20. The RDU of claim 18, further comprising a locking plate configured to engage the side gear, the sleeve being configured to exert a force upon the locking plate through a pin extending through the at least one planetary gear to move the locking plate into engagement with the side gear in a third position, and wherein, in the third position, the shift collar is configured to transfer torque to the side gear through the sun gear, the at least one planetary gear, and the locking plate.

* * * * *